(12) United States Patent
Sammak et al.

(10) Patent No.: US 12,318,727 B2
(45) Date of Patent: Jun. 3, 2025

(54) SYSTEM AND METHOD FOR CONTROLLING A TEMPERATURE IN AN ABSORBER

(71) Applicant: General Electric Company, Schenectady, NY (US)

(72) Inventors: Majed Sammak, Dammam (SA); Parag P. Kulkarni, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 641 days.

(21) Appl. No.: 17/556,901

(22) Filed: Dec. 20, 2021

(65) Prior Publication Data

US 2023/0191315 A1   Jun. 22, 2023

(51) Int. Cl.
*B01D 53/18* (2006.01)
*B01D 53/14* (2006.01)

(52) U.S. Cl.
CPC ......... *B01D 53/18* (2013.01); *B01D 53/1475* (2013.01)

(58) Field of Classification Search
CPC ............................. B01D 53/18; B01D 53/1475
USPC ........................................................ 423/212
See application file for complete search history.

(56) References Cited

U.S. PATENT DOCUMENTS

| | | |
|---|---|---|
| 5,603,377 A | 2/1997 | Fujii et al. |
| 7,347,049 B2 | 3/2008 | Rajendran et al. |
| 7,377,967 B2 | 5/2008 | Reddy et al. |
| 7,906,087 B2 | 3/2011 | Aroonwilas et al. |
| 2005/0284613 A1 | 12/2005 | Gunawardana |
| 2010/0242731 A1 | 9/2010 | Baburao et al. |
| 2015/0122461 A1 | 5/2015 | Nishiguchi et al. |
| 2018/0001259 A1 | 1/2018 | Singh et al. |
| 2018/0104642 A1 | 4/2018 | Mabrouk et al. |

FOREIGN PATENT DOCUMENTS

| | | |
|---|---|---|
| WO | 2004073838 A1 | 9/2004 |
| WO | 2014127410 A1 | 8/2014 |

OTHER PUBLICATIONS

PCT International Search Report and Written Opinion; Application No. PCT/US2022/81652; dated Mar. 10, 2023; 10 pages.

*Primary Examiner* — Anita Nassiri-Motlagh
(74) *Attorney, Agent, or Firm* — Fletcher Yoder, P.C.

(57) ABSTRACT

A system includes an absorber having a vessel with a solvent inlet, a solvent outlet, a gas inlet, a gas outlet, and an interior volume configured to mix a gas and a solvent, wherein the absorber is configured to absorb an undesirable gas from the gas into the solvent. The system also includes at least one heat pipe coupled to the vessel, wherein the at least one heat pipe is configured to transfer heat away from at least one position along the absorber.

20 Claims, 6 Drawing Sheets

SYSTEM AND METHOD FOR CONTROLLING A TEMPERATURE IN AN ABSORBER

BACKGROUND

The present application relates generally to a system and method for controlling a temperature in an absorber configured to treat a gas, such as a gas fuel or an exhaust gas.

An industrial plant, such as a power plant, may consume or produce a variety of gases, such as a fuel gas (e.g., natural gas or synthesis gas) and/or an exhaust gas of a combustion system. The combustion system may include a gas turbine engine, a reciprocating piston-cylinder engine, a furnace, a boiler, or other industrial equipment. These gases may include one or more undesirable gases, such as acid gases and/or exhaust emissions gases. For example, as the undesirable gases may include hydrogen sulfide ($H_2S$), carbon oxides such as carbon dioxide ($CO_2$), nitrogen oxides such as nitrogen dioxide ($NO_2$), and/or sulfur oxides such as sulfur dioxide ($SO_2$). Accordingly, it may be desirable to treat certain gases to remove the undesirable gases, such as by removing the undesirable gases from the fuel gas upstream of the combustion system and/or removing the undesirable gases from the exhaust gas discharged by the combustion system. An absorber may be used for such gas treatment. An absorption efficiency in the absorber is at least partially dependent on a temperature in the absorber. For example, if the temperature in the absorber is too high and/or non-uniform, then the absorber may experience a substantial decrease in the absorption efficiency. Accordingly, a need exist to control the temperature in the absorber to improve the absorption efficiency.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system includes an absorber having a vessel with a solvent inlet, a solvent outlet, a gas inlet, a gas outlet, and an interior volume configured to mix a gas and a solvent, wherein the absorber is configured to absorb an undesirable gas from the gas into the solvent. The system also includes at least one heat pipe coupled to the vessel, wherein the at least one heat pipe is configured to transfer heat away from at least one position along the absorber.

In certain embodiments, a method includes absorbing an undesirable gas from a gas into a solvent in an absorber, wherein the absorber includes a vessel having a solvent inlet, a solvent outlet, a gas inlet, a gas outlet, and an interior volume configured to mix the gas and the solvent. The method also includes transferring heat away from at least one position along the absorber via at least one heat pipe coupled to the vessel.

In certain embodiments, a system includes a gas turbine system having a fuel supply system and an exhaust section, and an absorber coupled to the fuel supply system or the exhaust section. The absorber includes a vessel having a solvent inlet, a solvent outlet, a gas inlet, a gas outlet, and an interior volume configured to mix a gas and a solvent. The absorber is configured to absorb an undesirable gas from the gas into the solvent, wherein the undesirable gas includes carbon dioxide ($CO_2$) or hydrogen sulfide ($H_2S$). The system also includes at least one heat pipe coupled to the vessel, wherein the at least one heat pipe is configured to transfer heat away from at least one position along the absorber.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

One or more specific embodiments of the presently disclosed systems are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The disclosed embodiments provide temperature control for a gas absorption system using one or more heat pipes. The heat pipes may be coupled to an absorber at various positions to control a temperature profile of the absorber and to increase an absorption efficiency of the absorber. The heat pipes may be configured to: transfer heat from one position to another along the absorber, transfer heat away from the absorber (e.g., at relatively hot spots), and/or transfer heat into the absorber (e.g., at relatively cold spots). In certain embodiments, the heat pipes may include an evaporator coupled to the absorber, wherein the evaporator may be disposed external, internal, or a combination thereof, relative to an interior surrounded by a vessel or enclosure of the absorber. Additionally, the heat pipes may include a condenser disposed separate from the absorber and/or coupled to the absorber. If the condenser is coupled to the absorber, then the condenser may be disposed external, internal, or a combination thereof, relative to the interior surrounded by the vessel or enclosure of the absorber. The heat pipes may provide one or more advantages to controlling the temperature of the absorber. For example, the heat pipes may reduce maintenance and improve reliability by eliminating any moving parts, and the heat pipes may increase heat transfer efficiency to better control the temperature profile of the absorber.

Figure 1:
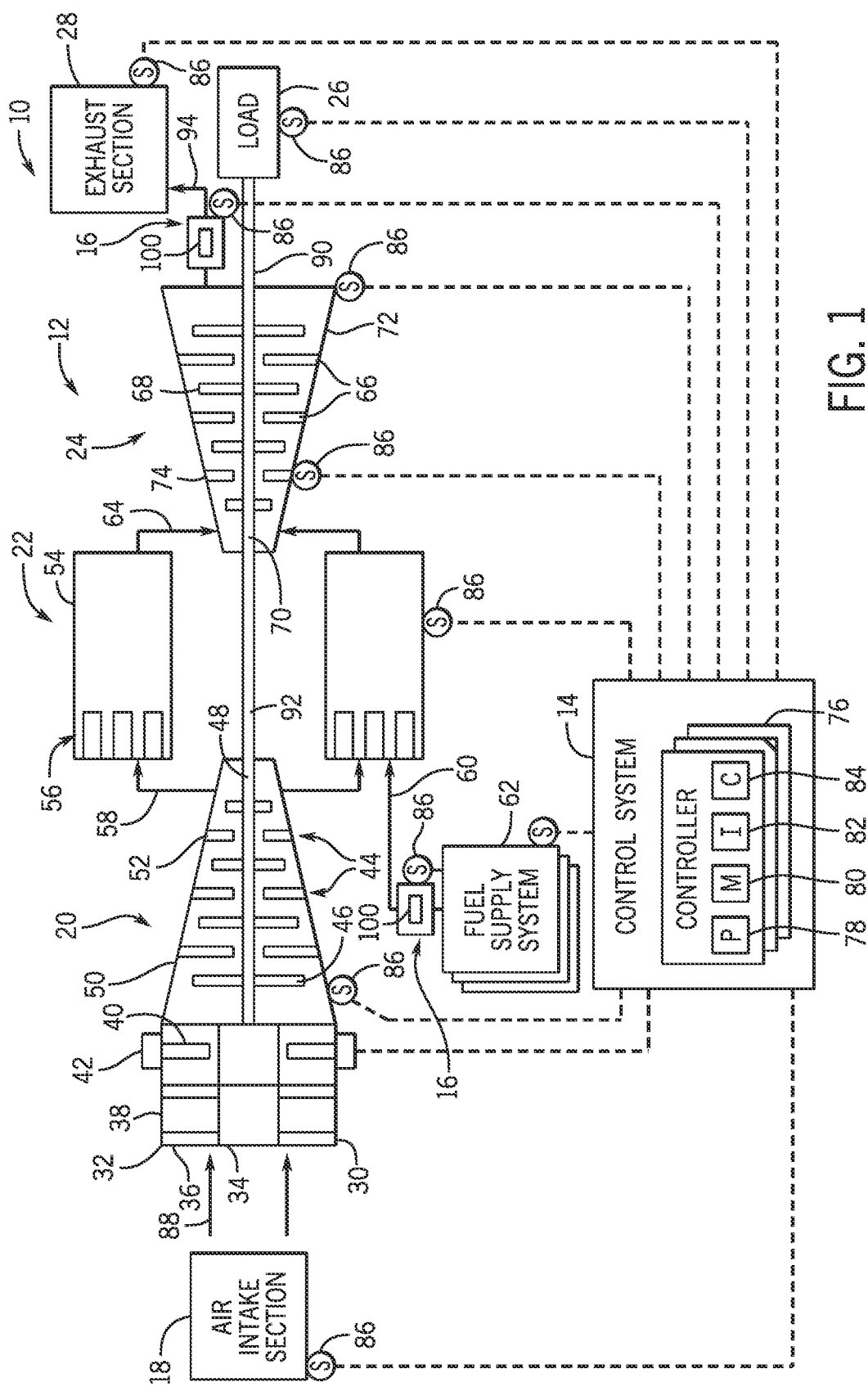
FIG. 1 is a schematic of an embodiment of a gas turbine system having a gas absorption system with one or more heat pipes coupled to an absorber.

FIG. 1 is a block diagram of an embodiment of a gas turbine system 10 having a gas turbine engine 12 coupled to a control system 14. As discussed in further detail below, the gas turbine system 10 may include a gas absorption system 16 to treat one or more gases in the gas turbine system 10. The various features of the gas absorption system 16 are discussed in further detail below, and the various features may be used in any suitable combination with one another. However, before moving on to the gas absorption system 16, the gas turbine system 10 will be described as one possible context for use of the gas absorption system 16.

The gas turbine engine 12 includes an air intake section 18, a compressor section 20, a combustor section 22, a turbine section 24, a load 26, and an exhaust section 28. The air intake section 18 may include a duct having one or more silencer baffles, fluid injection systems (e.g., heated fluid injection for anti-icing), air filters, or any combination thereof. The compressor section 20 may include an upstream inlet duct 30 having a bell mouth 32, wherein the inlet duct 30 includes an air intake path between an inner hub 34 and an outer wall 36. The inlet duct 30 also includes stationary vanes 38 and inlet guide vanes (IGVs) 40. The inlet guide vanes 40 also may be coupled to one or more actuators 42, which are communicatively coupled to and controlled by the control system 14.

The compressor section 20 includes one or more compressor stages 44, wherein each compressor stage 44 includes a plurality of compressor blades 46 coupled to a compressor shaft 48 within a compressor casing 50, and a plurality of compressor vanes 52 coupled to the compressor casing 50. The compressor blades 46 and the compressor vanes 52 are arranged circumferentially about a central axis of the compressor shaft 48 within each compressor stage 44. The compressor stages 44 may include between 1 and 30 or more compressor stages. Additionally, the compressor stages 44 alternative between sets of the compressor blades 46 and sets of the compressor vanes 52 in the direction of air flow through the compressor section 20. In operation, the compressor stages 44 progressively compress the intake air flow before delivery to the combustor section 22.

The combustor section 22 includes one or more combustors 54 each having one or more fuel nozzles 56. In certain embodiments, the combustor section 22 may have a single annular combustor 54 extending around a central axis of the gas turbine engine 12. However, in some embodiments, the combustor section 22 may include 2, 3, 4, 5, 6, or more combustors 54 spaced circumferentially about the central axis of the gas turbine engine 12. The fuel nozzles 56 receive a compressed air 58 from the compressor section 20 and fuel 60 from one or more fuel supply systems 62, mix the fuel and air, and ignite the mixture to create hot combustion gases 64, which then exit each combustor 54 and enter the turbine section 24.

The turbine section 24 includes one or more turbine stages 66, wherein each turbine stage 66 includes a plurality of turbine blades 68 arranged circumferentially about and coupled to a turbine shaft 70 inside of a turbine casing 72, and a plurality of turbine vanes 74 arranged circumferentially about the turbine shaft 70. The turbine stages 66 may include between 1 and 10 or more turbine stages. Additionally, the turbine stages 66 alternate between sets of the turbine blades 68 and sets of the turbine vanes 74 in the direction of hot combustion gas flow through the turbine section 24. In operation, the hot combustion gases 64 progressively expand and drive rotation of the turbine blades 68 in the turbine stages 66.

The load 26 may include an electrical generator, a machine, or some other driven load. The load 26 may be disposed at the hot end of the gas turbine engine 12 as illustrated in FIG. 1, or the load 26 may be disposed at the cold end of the gas turbine engine 12 (e.g., adjacent the compressor section 20). The exhaust section 28 may include an exhaust duct, exhaust treatment equipment, silencers, or any combination thereof. In some embodiments, the exhaust section 28 may include a heat exchanger, such as a heat recovery steam generator (HRSG) configured to generate steam to drive a steam turbine. In certain embodiments, the gas turbine system 10 may include a combined cycle power plant having the gas turbine engine 12, the HRSG, and one or more steam turbines driven by steam generated by the HRSG. The steam turbines, similar to the gas turbine engine 12, may be configured to drive electrical generators or other loads.

The control system 14 may include one or more controllers 76, each having a processor 78, memory 80, instructions 82 stored on the memory 80 and executable by the processor 78, and communications circuitry 84 configured to communicate with the gas absorption system 16. The control system 14 is also coupled to various sensors (S) as indicated by element number 86 throughout the gas turbine system 10. For example, the sensors 86 may be coupled to and monitor conditions at the air intake section 18, the compressor section 20, the fuel supply systems 62, the combustors 54 of the combustor section 22, the turbine section 24, the load 26, the exhaust section 28, and the gas absorption system 16. The control system 14 is configured to receive feedback from the sensors 86 to facilitate adjustments of various operating parameters of the gas turbine engine 12, such as the air intake flow, the fuel supply from the fuel supply system 62 to the combustors 54, operation of exhaust treatment equipment in the exhaust section 28, operation of the gas absorption system 16 (e.g., flow and temperature control), or any combination thereof. For example, the control system 14 may be configured to control the flow of solvent in the gas absorption system 16, the flow of gas in the gas absorption system 16, and various aspects of temperature control throughout the gas absorption system 16. As discussed in further detail below, the gas absorption system 16 is configured to remove and/or capture one or more undesirable gases (e.g., acid gases and/or exhaust emissions gases) from the incoming gas, and provide improved absorption efficiency of such undesirable gases via an improved temperature control. The undesirable gases are intended to cover any gases that may be undesirable in the fuel supply and/or exhaust gas. For example, the undesirable gases may include acid gases present in the fuel supply and the exhaust gases. By further example, the undesirable gases in the exhaust gases may include any exhaust emissions gases typically subject to regulation, including but not limited to, carbon oxides ($CO_X$) such as carbon dioxide ($CO_2$) and carbon monoxide (CO), nitrogen oxides ($NO_X$), sulfur oxides ($SO_X$) such as sulfur dioxide ($SO_2$), or any combination thereof. The disclosed embodiments are particularly well suited for gas absorption of $CO_2$ from the exhaust gas. However, the following discussion is intended to cover each of these examples when referring to undesirable gases.

In operation, the gas turbine system 10 receives air into the inlet duct 30 from the air intake section 18 as indicated by arrows 88, the inlet guide vanes 40 are controlled by the actuators 42 to adjust an angular position of the inlet guide vanes 40 for adjusting air flow into the compressor section 20, and the compressor section 20 is configured to compress the air flow being supplied into the combustor section 22. For example, each stage 44 of the compressor section 20 compresses the air flow with a plurality of the blades 46. The compressed air flow 58 then enters each of the combustors 54, where the fuel nozzles 56 mix the compressed air flow with fuel 60 from the fuel supply system 62. The mixture of fuel and air is then combusted in each combustor 54 to generate the hot combustion gases 64, which flow into the turbine section 24 to drive rotation of the turbine blades 68 in each of the stages 66. The rotation of the turbine blades 68 drives rotation of the turbine shaft 70, which in turn drives rotation of the load 26 and the compressor section 20 via a shaft 90 coupled to the load 26 and a shaft 92 coupled to the compressor shaft 48. The turbine section 24 then discharges an exhaust gas 94 into the exhaust section 28 for final treatment and discharge into the environment.

In the illustrated embodiment, the gas turbine system 10 has the gas absorption system 16 coupled to one or more fuel supply systems 62 and the exhaust section 28. However, the gas absorption system 16 also may be coupled to one or more reciprocating piston-cylinder engines, furnaces, boilers, chemical reactors, gasification systems having one or more gasifiers configured to produce a synthesis gas, or other industrial equipment. Each of these gas absorption systems 16 has the features described in further detail below, and the disclosed embodiments are intended to be used in various combinations with one another in all of the foregoing applications.

As illustrated, the gas absorption system 16 includes one or more phase transition heat transfer devices or pipes, such as heat pipes 100, configured to transfer heat away from and/or between different areas of the gas absorption system 16. The heat pipes 100 may be partially or entirely mounted outside and/or inside the gas absorption system 16. For example, the heat pipes 100 may include evaporators and/or condensers mounted on an interior surface and/or exterior surface of the gas absorption system 16, within an interior volume of the gas absorption system 16, and/or within an exterior volume or surrounding environment (e.g., condensers at an offset distance). The heat pipes 100 may be specifically located at hot spots to reduce internal temperatures to levels suitable to increase efficiency of the absorption process in the gas absorption system 16, and the heat pipes 100 may transfer heat from hot spots to cold spots (or cooler spots) of the gas absorption system 16 to provide a more uniform temperature profile in the gas absorption system 16. The heat pipes 16 may provide certain benefits, such as no mechanical moving parts, low or no maintenance, and improved efficiency in transferring heat. Various aspects of the gas absorption system 16 and the heat pipes 100 are discussed in further detail below.

Figure 2:
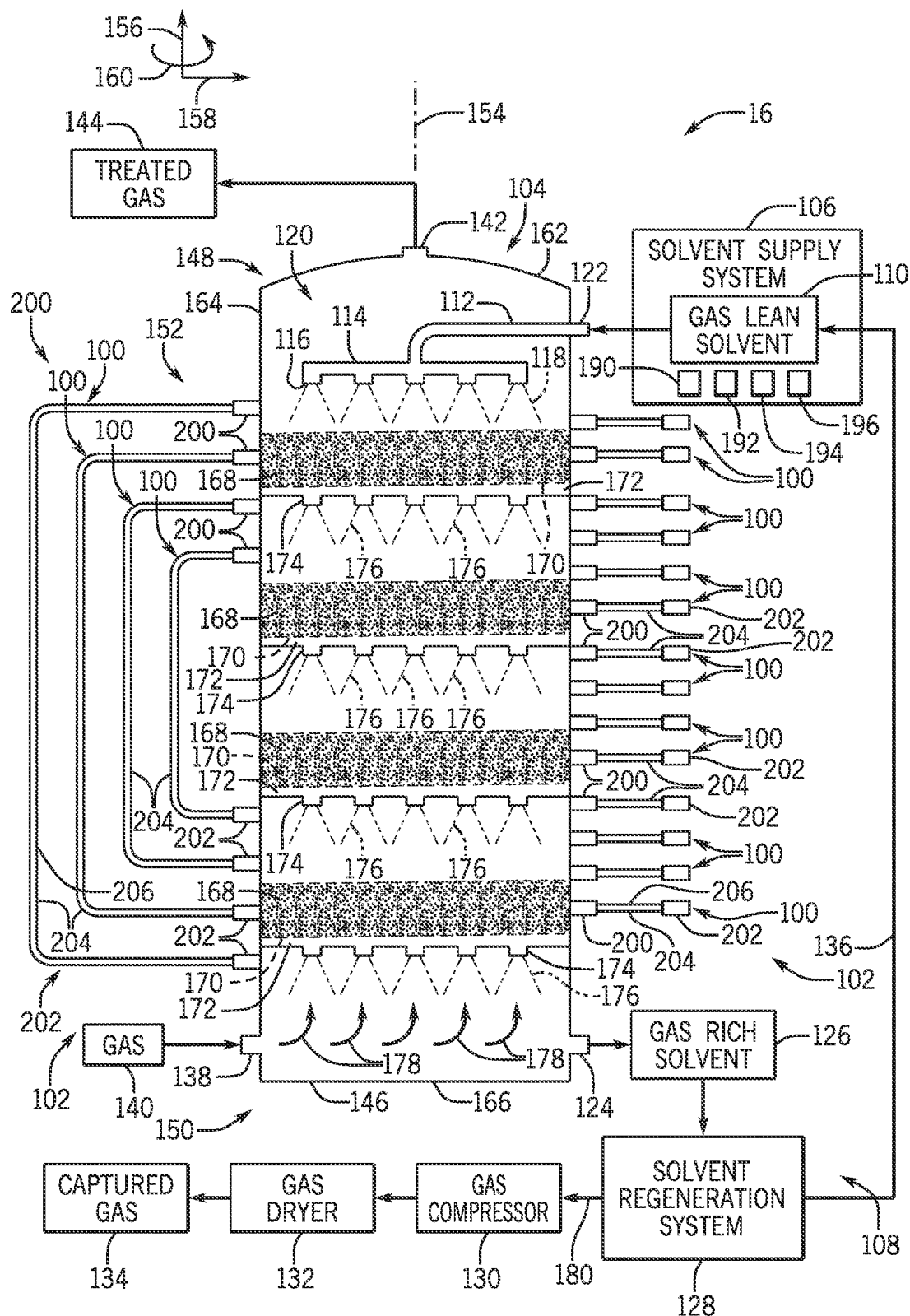
FIG. 2 is a schematic side view of an embodiment of the absorber of the gas absorption system of FIG. 1, further illustrating a plurality of heat pipes disposed at various positions along the absorber.
Figure 3:
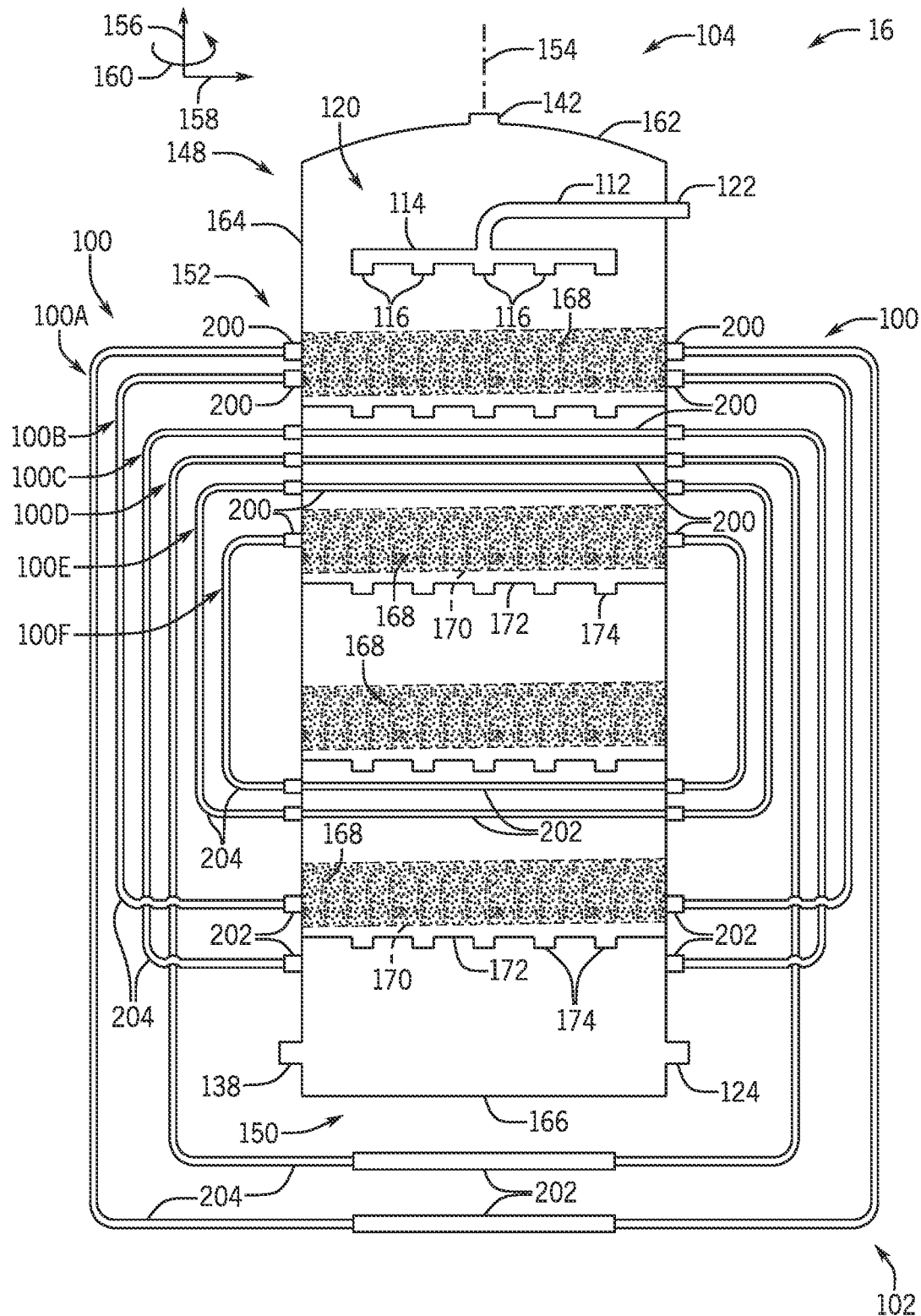
FIG. 3 is a schematic side view of an embodiment of the gas absorption system of FIGS. 1 and 2, further illustrating a plurality of heat pipes with internal and external arrangements of evaporators and condensers.

FIG. 2 is a schematic of an embodiment of the gas absorption system 16 of FIG. 1, further illustrating details of heat pipes 100 distributed at various positions about the gas absorption system 16. As illustrated, the heat pipes 100 are part of a temperature control system 102, which may include any number, configuration, type, and placement of the heat pipes 100 at various internal and external locations of the gas absorption system 16. The gas absorption system 16 includes an absorber 104, a solvent supply system 106, and a solvent discharge system 108. The illustrated heat pipes 100 are shown coupled to the absorber 104 at various positions spaced apart from one another. However, for sake of simplicity and to focus on internal aspects of the absorber 104, the heat pipes 100 are not shown inside of the absorber 104. Various configurations of the heat pipes 100, including portions extending inside of the absorber 104, are shown in FIG. 3 and are intended for use in the absorber 104 of FIG. 2.

As discussed in further detail below, the solvent supply system 106 is configured to supply a gas lean solvent 110 into the absorber 104 through a conduit 112 coupled to a solvent distributor 114 having a plurality of nozzles 116. The nozzles 116 are configured to output a solvent dispersion 118 into an interior volume 120 of the absorber 104. The solvent dispersion 118 helps to distribute the gas lean solvent 110 more uniformly throughout the interior volume 120, such that the solvent has a more uniform temperature distribution when flowing downwardly through the absorber 104 toward the solvent discharge system 108. The conduit 112 is coupled to a solvent inlet 122 of the absorber 104, while the solvent discharge system 108 is coupled to a solvent outlet 124 of the absorber 104.

The solvent discharge system 108 is configured to receive a gas rich solvent 126 from the solvent outlet 124 and route the gas rich solvent 126 to a solvent regeneration system 128. The solvent discharge system 108 also includes a gas compressor 130 downstream from the solvent regeneration system 128, a gas dryer 132 downstream from the gas compressor 130, and an outlet of a captured gas 134 downstream from the gas dryer 132. The solvent discharge system 108 also provides a return conduit 136 from the solvent regeneration system 128 back to the solvent supply system 106, such that a regenerated solvent may be returned back to the solvent supply system 106 as a gas lean solvent 110.

The absorber 104 also includes a gas inlet 138 configured to receive a gas 140 into the absorber 104, and a gas outlet 142 configured to discharge a treated gas 144 out of the absorber 104. In the illustrated embodiment, the absorber 104 includes a vessel or enclosure 146 having a top portion 148, a bottom portion 150, and an intermediate portion 152 disposed axially between the top and bottom portions 148 and 150 relative to a central axis 154 of the enclosure 146. In the following discussion, reference may be made to an axial direction or axis 156 disposed along the central axis 154, a radial direction or axis 158 crosswise or perpendicular to the central axis 154, and a circumferential direction or axis 160 extending circumferentially about the central axis 154. The top portion 148 includes a top plate or cover 162 having the gas outlet 142 coaxial with the central axis 154. However, the gas outlet 142 may be disposed offset from the central axis 154 or at other locations along the top portions 148.

The intermediate portion 152 includes a sidewall 164 extending in the circumferential direction 160 about the central axis 154. For example, the sidewall 164 may be an annular sidewall, a square shaped sidewall, a rectangular sidewall, or any other suitable shape that extends around the central axis 154. In certain embodiments, the gas outlet 142 may be disposed in the sidewall 164 along the top portion 148. Additionally, the solvent inlet 122 may be disposed along the top plate or cover 162 or the sidewall 164 in the top portion 148.

The bottom portion 150 may include a base plate 166 below the gas inlet 138 and the solvent outlet 124. In the illustrated embodiment, the gas inlet 138 and the solvent outlet 124 are disposed in the sidewall 164 along the bottom portion 150. However, in certain embodiments, the gas inlet 138 and/or the solvent outlet 124 may be disposed in the base plate 166 in the bottom portion 150. In some embodiments, the gas inlet 138 may include a plurality of gas inlets and/or the solvent outlet 124 may include a plurality of solvent outlets.

Within the interior volume 120 of the absorber 104, the absorber 104 may further include one or more sets of a packing 168, a support tray or screen 170, and a solvent distributor 172 having a plurality of nozzles 174. For example, in the illustrated embodiment, the absorber 104 includes four sets of components (e.g., the packing 168, the support tray or screen 170, and the solvent distributor 172) disposed between the solvent distributor 114 and the bottom portion 150 having the gas inlet 138 and the solvent outlet 124. The packing 168 may include a plurality of beads, balls, or mixture inducing structures, which are configured to facilitate mixing between the gas 140 and the gas lean solvent 110 being supplied into the interior volume 120 of the absorber 104. The support tray or screen 170 may include a wire mesh, a plate having a plurality of openings, or another suitable structure that holds the packing 168 in position while permitting fluid flow of gas and solvent through the support tray or screen 170 in opposite directions through the absorber 104. The solvent distributor 172 may be similar to the solvent distributor 114, and thus the nozzles 174 may be distributed in a uniform manner throughout the interior volume 120 to output a solvent dispersion 176 to better distribute the solvent passing through the packing 168 and the support tray or screen 170. The sets of the packing 168, the support tray or screen 170, and the solvent distributor 172 are spaced apart from one another along the central axis 154. However, the spacing may be increased or decreased or even eliminated in certain embodiments of the absorber 104.

In operation, the absorber 104 is configured to create a cross-flow or opposing flow of the gas lean solvent 110 and the gas 140 within the interior volume 120, thereby facilitating gas absorption of certain undesirable gases (e.g., acid gases and/or exhaust emissions gases) from the gas 140 into the gas lean solvent 110. As illustrated, at the bottom portion 150, the gas 140 enters the absorber 104 through the gas inlet 138, and the gas 140 flows upwardly through the interior volume 120 of the absorber 104 as indicated by arrows 178. The gas 140 entering the absorber 104 as indicated by arrows 178 may form bubbles of the gas 140 that rise upwardly through the gas lean solvent 110 within the interior volume 120. The gas 140 then passes through each subsequent stage or set of the packing 168, the support tray or screen 170, and the solvent distributor 172.

At the top portion 148, the solvent supply system 106 feeds the gas lean solvent 110 into the interior volume 120 through the solvent inlet 122, the conduit 112, the solvent distributor 114, and the plurality of nozzles 116. Again, the nozzles 116 may be distributed at various positions across the interior volume 120 to help distribute the gas lean solvent 110 more uniformly throughout the interior volume 120, as indicated by the solvent dispersions 118. The gas lean solvent 110 then flows downwardly through the interior volume 120 through each subsequent set or stage of the packing 168, the support tray or screen 170, and the solvent distributor 170 having the nozzles 174. As the gas lean solvent 110 passes through each packing 168, the various beads, balls, or mixing structures in the packing 168 are configured to help mix the gas lean solvent 110 with the gas 140, thereby helping to absorb various undesirable gases from the gas 140 into the gas lean solvent 110. For example, the gas lean solvent 110 may be configured to absorb carbon dioxide ($CO_2$), hydrogen sulfide ($H_2S$), sulfur dioxide ($SO_2$), or other acid gases and/or exhaust emissions gases. As the absorption process occurs, heat is generated within the absorber 104, thereby raising the temperature of the solvent within the absorber 104. The absorption process continues within each set or stage of the packing 168, the support tray or screen 170, and the solvent distributor 172. Between each stage or set, the solvent distributor 172 helps to better distribute the solvent as indicated by the solvent dispersions 176. The solvent dispersions 176 may help to uniformly mix the solvent with the gas 140 and prove more uniformity in the temperature distribution. The absorption process then repeats in the next set or stage of the packing 168, the support tray or screen 170, and the solvent distributor 172.

Eventually, the absorber 104 discharges a gas rich solvent 126 at the bottom portion 150 through the solvent outlet 124, and the absorber 104 discharges the treated gas 144 at the top portion 148 through the gas outlet 142. The treated gas 144 may be substantially free or stripped of one or more undesirable gases, such as the carbon dioxide, the hydrogen sulfide, and/or the sulfur dioxide. In contrast, the gas rich solvent 126 may have absorbed the one or more undesirable gases, such as the carbon dioxide, the hydrogen sulfide, and/or the sulfur dioxide. Accordingly, the gas rich solvent 126 may be described as a $CO_2$ rich solvent, a $H_2S$ rich solvent, or a $SO_2$ rich solvent, while the gas lean solvent 110 may be described as a $CO_2$ lean solvent, a $H_2S$ lean solvent, or a $SO_2$ lean solvent depending on the particular gas absorption occurring in the absorber 104. Similarly, the gas 104 may be described as a $CO_2$ containing or rich gas, a $H_2S$ containing or rich gas, or a $SO_2$ containing or rich gas, while the treated gas 144 may be described as a $CO_2$ reduced, lean, or free gas, a $H_2S$ reduced, lean, or free gas, or a $SO_2$ reduced, lean, or free gas depending on the particular gas absorption occurring in the absorber 104. The gas absorption discussed herein is intended to cover any one or more of these undesirable gases, as well as other potential acid gases and/or exhaust emissions gases.

The gas rich solvent 126 output from the absorber 104 flows into the solvent regeneration system 128, which may be configured to capture the undesirable gases (e.g., $CO_2$) in the gas rich solvent 126 and regenerate the solvent (e.g., remove the undesirable gases (e.g., $CO_2$) for reuse of the solvent as the gas lean solvent 110). Accordingly, the undesirable gases (e.g., $CO_2$) may be output from the solvent regeneration system 128 to the gas compressor 130 as indicated by arrow 180, such that the gas compressor 130 is configured to compress the undesirable gases prior to being dried by the gas dryer 132. The gas dryer 132 then removes any moister content in the compressed undesirable gases from the gas compressor 130, and then outputs the compressed and dried undesirable gases as a captured gas 134. Additionally, the solvent regeneration system 128 outputs the regenerated solvent as the gas lean solvent 110 being returned to the solvent supply system 106 through a return conduit 136. The regenerated solvent is essentially the gas rich solvent 126 with the undesirable gases removed in the solvent regeneration system 128.

In the solvent supply system 106, the gas lean solvent 110, whether an original supply of gas lean solvent 110 or a regenerated solvent from the solvent regeneration system 128, is supplied into the absorber 104 with one or more components 190, 192, 194, and 196. The components 190, 192, 194, and 196 may include one or more solvent pumps, solvent filters or treatment systems, one or more heat exchangers configured to cool the gas leans solvent 110, one or more solvent tanks, one or more solvent pressure regulators, one or more solvent flow meters, or any combination thereof. As discussed above, the absorption process occurring within the absorber 104 may increase the temperature within the absorber 104 particularly at locations where the absorption process occurs. For example, the internal temperature of the solvent within the absorber 104 may be relatively higher at locations of the packings 168.

Accordingly, the temperature control system 102 may include a plurality of the heat pipes 100 disposed at various locations along the absorber 104 to remove heat and/or transfer heat from one location to another. For example, as indicated on the right-hand side of the absorber 104, the temperature control system 102 may include a plurality of the heat pipes 100 disposed at various axial positions along the central axis 154, wherein each heat pipe 100 includes an evaporator 200 coupled to the absorber 104, a condenser 202 separate from the absorber 104, and a fluid conduit 204 extending between the evaporator 200 and the condenser 202. The fluid conduit 204 is configured to circulate a working fluid 206 between the evaporator 200 and the condenser 202, such that the working fluid 206 undergoes a phase change to transfer heat between the evaporator 200 and the condenser 202. In particular, the working fluid 206 is configured to evaporate in the evaporator 200 in response to heat transfer from the interior volume 120 into the working fluid 206. Accordingly, the working fluid 206 may become a vapor or a two-phase flow in response to the heat absorbed in the evaporator 200, such that a vapor or two-phase flow then flows through the fluid conduit 204 to the condenser 202, where the condenser 202 is configured to transfer heat away from the working fluid 206 into the environment. As a result, the heat transfer to the environment results in the working fluid 206 condensing into a liquid flow, which then flows back through the fluid conduit 204 to the evaporator 200 to repeat the cycle.

In certain embodiments, the working fluid 206 may have a boiling temperature based on a desired temperature for the absorption process. For example, the boiling temperature of the working fluid 206 may be 30 to 80, 40 to 70, or 45 to 65 degrees Celsius. The working fluid 206 may include one or more alcohols, molten salts, water, or any combination thereof. The working fluid 206 may include at least one of Cyclopentane (C5H10), a Hydrofluoroether (HFE), or a mixture of methyl nonafluorobutyl ether (methoxyperfluorobutane) and methyl nonfluoroisobutyl ether. In certain embodiments, the working fluid 206 may include one or more engineered fluids, such as a Dodecafluoro-2-methylpentan-3-one ($CF_3CF_2C(O)CF(CF_3)_2$) [e.g., 3M™ Novec™ 649 Engineered Fluid], a 1-methoxyheptafluoropropane ($C_3F_7OCH_3$) [e.g., 3M™ Novec™ 7000 Engineered Fluid], a methoxy-nonafluorobutane ($C_4F_9OCH_3$) [e.g., 3M™ Novec™ 7100 Engineered Fluid], an ethoxy-nonafluorobutane ($C_4F_9OC_2H_5$) [e.g., 3M™ Novec™ 7200 Engineered Fluid], a segregated hydrofluoroether [e.g., 3M™ Novec™ 7300 Engineered Fluid], or a combination thereof. The working fluid 206 also may include thiophene ($C_4H_4S$), DTRM-J, DTRM-A, or any combination thereof. The foregoing examples of working fluids 206 are intended for use alone or in any combination with one another. Additionally, in some embodiments, the heat pipes 100 may use different working fluids 206 depending on the location along the absorber 104, the desired temperatures at the various positions along the absorber 104, and the boiling temperatures of the working fluids 206. However, in some embodiments, the same working fluid(s) 206 may be used for multiple or all of the heat pipes 100.

The fluid conduit 204 may include a coaxial counter flow conduit having an outer fluid flow and an inner fluid flow between the evaporator 200 and the condenser 202, a loop having two separate conduits (e.g., supply conduit and return conduit) between the evaporator 200 and the condenser 202, or any combination thereof. The fluid conduit 204 may be made of a thermally conductive material (e.g., metal) compatible with the working fluid 206. For example, the thermally conductive material of the fluid conduit 204 may include copper, aluminum, steel, or a superalloy. The heat pipe 100 also may include a wick material disposed within the fluid conduit 204 to facilitate the fluid flow through the fluid conduit 204. The wick material may include a porous material, such as a fabric, cloth, interlocking bundles of yarn or threads, cotton, or a combination thereof. The wick material functions by a capillary action to convey or wick a fluid flow (e.g., liquid flow) from the condenser 202 to the evaporator 200. In certain embodiments, the heat pipe 100 may be configured in a horizontal arrangement, a vertical arrangement, or a loop having horizontal or vertical orientations. In a vertical configuration, the heat pipe 100 may use gravity to facilitate the fluid flow of the working fluid 206 between the evaporator 200 and the condenser 202.

As illustrated in FIG. 2, the heat pipes 100 disposed on the right-hand side of the absorber 104 all have a similar configuration. However, each of the heat pipes 100 may have the same or different configuration, such as a vertical or horizontal orientation, a length of the fluid conduit 204, a type of heat pipe, or other parameters. Additionally, the evaporator 200 of the heat pipes 100 is shown coupled to the sidewall 164 of the absorber 104. However, the illustrated configuration is for simplicity in the current depiction of the gas absorption system 16. The evaporators 200 of the heat pipes 100 may be disposed internally or externally relative to the absorber 104. For example, as discussed in further detail below, each of the evaporators 200 may be mounted externally to the sidewall 164, internally to the sidewall 164, internally across the interior volume 120, or any combination thereof.

On the left-hand side of the absorber 104, the temperature control system 102 includes a plurality of the heat pipes 100 having both the evaporators 200 and the condensers 202 coupled to the absorber 104, thereby facilitating heat transfer from one location to another at different axial positions along the central axis 154 of the absorber 104. For example, the illustrated heat pipes 100 each include the evaporators 200 coupled to the absorber 104 at a first upper portion (e.g., along the intermediate portion 152 and/or the top portion 148) of the absorber 104, and the condensers 202 disposed at a second lower portion (e.g., the intermediate portion 152 and/or the bottom portion 150) of the absorber 104. Similar to the heat pipes 100 on the right-hand side of the absorber 104, the heat pipes 100 on the left-hand side of the absorber 104 are shown with the evaporator 200 and the condenser 202 coupled to the sidewall 164. However, the evaporators 200 and/or the condensers 202 may be mounted to an exterior surface of the sidewall 164, an interior surface of the sidewall 164, across the interior volume 120, or any combination thereof. Additionally, although the fluid conduit 204 is illustrated as a single conduit between each evaporator 200 and corresponding condenser 202, certain embodiments of the heat pipes 100 may form a loop rather than having a single conduit extending between the evaporator 200 and the condenser 202, as illustrated in FIG. 3. In either configuration, the fluid conduit 204 is configured to circulate the working fluid 206 to and from the evaporator 200 and the condenser 202 to facilitate heat transfer as discussed above. For example, each evaporator 200 may be configured to transfer heat away from the absorber 104 (e.g., internal heat from the interior volume 120) at the first upper portion of the absorber 104, and then transfer the heat to the second lower portion of the absorber via the condensers 202.

Although the heat pipes 100 are shown differently on the left-hand and right-hand sides of the absorber 104, the heat pipes 100 may be arranged on any sides of the absorber 104 (e.g., any positions circumferentially about the absorber 104), any axial positions along the central axis 154 of the absorber 104, any radial positions at the sidewall 164 or projecting internally into the interior volume 120, or any combination thereof. For example, the heat pipes 100 may be coupled to the absorber 104 at any locations directly at the packings 168, between the packings 168, at the location of the solvent dispersions 118 and 176, or any combination thereof. For example, as discussed in further detail below, the evaporators 200 of the heat pipes 100 may be specifically located at areas of higher temperature due to the absorption process within the absorber 104. The condensers 202 may then be disposed at cooler portions of the absorber 104 or separately away from the absorber 104. In operation, the heat pipes 100 are configured to reduce the temperature of hot spots of the absorber 104 and help improve the efficiency of the absorption process within the absorber 104.

FIG. 3 is a schematic of an embodiment of the gas absorption system 16 of FIGS. 1 and 2, further illustrating various configurations of the heat pipes 100 of the temperature control system 102. As illustrated in FIG. 3, the heat pipes 100 may be coupled to the absorber 104 at various locations along the central axis 154, and the evaporators 200 and the condensers 202 may be mounted in various locations inside and outside of the vessel or enclosure 146 of the absorber 104. For example, a heat pipe 100A may have the evaporator 200 externally coupled to the sidewall 164 of the absorber 104 at one of the packings 168, and the fluid conduit 204 may extend from the evaporator 200 to a condenser 202 disposed outside of the absorber 104 at a distance offset away from the enclosure 146. Additionally, a heat pipe 100B may include the evaporator 200 externally coupled to the sidewall 164 of the absorber 104 at one of the packings 168 similar to the heat pipe 100A, and the fluid conduit 204 may extend from the evaporator 200 to the condenser 202 coupled externally to the sidewall 164 of the absorber 104 at another packing 168 at a different axial location along the central axis 154. Another heat pipe 100C may include the evaporator 200 coupled to the sidewall 164 and/or extending across the interior volume 120 of the absorber 104, while the fluid conduit 204 extends to the condenser 202 coupled externally to the sidewall 164 outside of the absorber 104 at a different axial location along the central axis 154. Another heat pipe 100D includes the evaporator 200 coupled to the sidewall 164 and/or extending across the interior volume 120 of the absorber 104, while the fluid conduit 204 extends from the evaporator 200 to the condenser 202 disposed outside of the absorber 104 at a distance offset away from the enclosure 146. Another heat pipe 100E includes the evaporator 200 coupled to the sidewall 164 and/or extending across the interior volume 120 of the absorber 104, while the fluid conduit 204 extends from the evaporator 200 to the condenser 202 coupled to the sidewall 164 and/or extending across the interior volume 120 of the absorber 104 at a different axial location along the central axis 154. Another heat pipe 100F includes the evaporator 200 externally coupled to the sidewall 164 of the absorber 104 at one of the packings 168, while the fluid conduit 204 extends from the evaporator 200 to the condenser 202 coupled to the sidewall 164 and/or extending across the interior volume 120 of the absorber 104 at a different axial location along the central axis 154 of the absorber 104.

Accordingly, the evaporators 200 may be disposed outside of the absorber 104 coupled to the sidewall 164, inside of the absorber 104 extending across the interior volume 120, or a combination thereof, while the condensers 202 may be coupled to the sidewall 164 outside of the absorber 104, extending across the interior volume 120 inside of the absorber 104, or outside of the absorber 104 completely separate from and offset away from the enclosure 146 of the absorber 104. In embodiments with the evaporator 200 and the condenser 202 coupled to the absorber 104, the evaporator 200 may be disposed at an axial position along the central axis 154 downstream from the location of the condenser 202 relative to a direction of gas flow through the absorber from the gas inlet 138 to the gas outlet 142. The evaporators 200 may be disposed at relatively hot spots within the absorber 104, such as locations at or downstream from the packings 168 relative to a direction of the gas flow through the absorber 104 from the gas inlet 138 to the gas outlet 142. In contrast, the condensers 202, when coupled to the absorber 104, may be disposed at relatively cold (or cooler) spots within the absorber 104. In certain embodiments, the condensers 202 may be disposed directly at the packings 168, between stages of the packings 168, or upstream from the packings 168. In the illustrated embodiment, the fluid conduits 204 may form a loop with the evaporators 200 and the condensers 202. However, the heat pipes 100 may have any suitable configuration, such as a single conduit having coaxial counter flows, a loop having separate segments or conduits between the evaporators 200 and the condensers 202, or any combination thereof. Specific details of the heat pipes 100 are discussed in further detail below.

The evaporator 200 and the condenser 202 may have a variety of shapes and configurations depending on the particular mounting location and embodiment. For example, each of the evaporators 200 and condensers 202 may have a straight conduit, a disc-shaped or planar cavity or enclosure, or a plurality of other shapes and configurations. For example, FIGS. 4, 5, 6, and 7 illustrate several examples of configurations of the evaporators 200 and the condensers 202.

Figure 4:
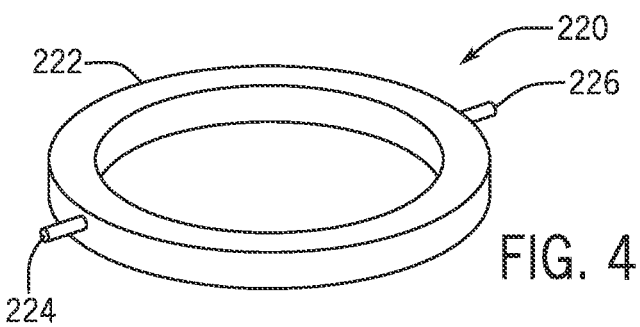
FIG. 4 is a perspective view of an embodiment of a heat exchanger that may be used for the evaporators and the condensers of the heat pipes of FIGS. 1-3, wherein the heat exchanger has a hollow annular or ring-shaped conduit.

FIG. 4 is a perspective view of an embodiment of a heat exchanger 220 that may be used for the evaporators 200 and the condensers 202 of the heat pipes 100. As illustrated, the heat exchanger 220 includes a hollow annular or ring-shaped conduit 222 having a fluid inlet 224 and a fluid outlet 226. The hollow annular or ring-shaped conduit 222 may be configured to mount externally along the absorber 104, such as about an exterior surface of the sidewall 164 of the enclosure 146. For example, with reference to FIGS. 2 and 3, the hollow annular or ring-shaped conduit 222 may be used for the evaporators 200 and/or the condensers 202 at locations externally mounted along the packings 168, between the packings 168, or any other suitable location.

Figure 5:
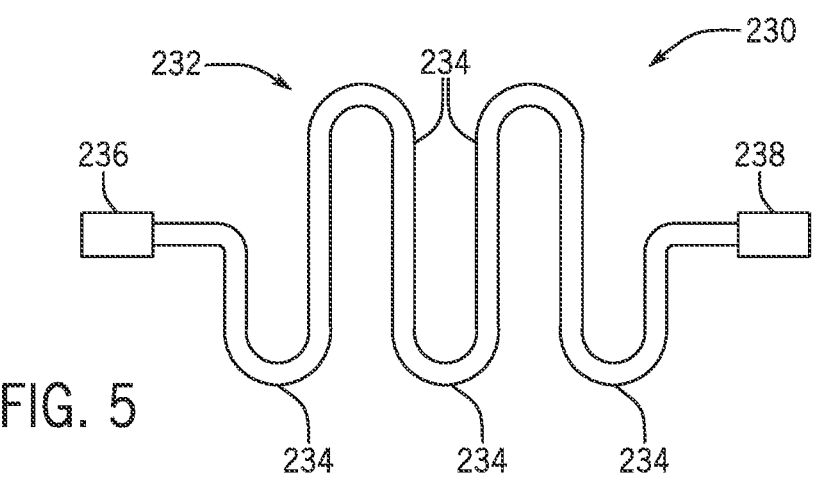
FIG. 5 is a top view of an embodiment of a heat exchanger that may be used for the evaporators and the condensers of the heat pipes of FIGS. 1-3, wherein the heat exchanger has a zigzagging conduit.

FIG. 5 is a schematic of an embodiment of a heat exchanger 230 that may be used for one or more of the evaporators 200 and the condensers 202 of the heat pipes 100. As illustrated, the heat exchanger 230 includes a zigzagging conduit 232 having alternating U-shaped portions 234, a fluid inlet 236, and a fluid outlet 238. The alternating U-shaped portions 234 define the zigzagging conduit 232, and may represent a wave-like pattern or sinusoidal shape. The zigzagging conduit 232 of the heat exchanger 230 may be mounted internally within the interior volume 120 of the absorber 104, externally along the sidewall 164 of the absorber 104, externally at a distance offset away from the absorber 104, or a combination thereof, for one or more of the evaporators 200 and the condensers 202.

Figure 6:
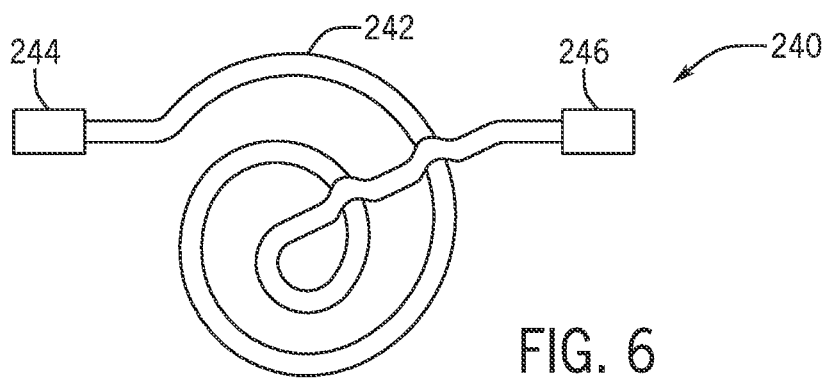
FIG. 6 is a top view of an embodiment of a heat exchanger that may be used for the evaporators and the condensers of the heat pipes of FIGS. 1-3, wherein the heat exchanger has a spiral conduit.

FIG. 6 is a schematic of an embodiment of a heat exchanger 240 that may be used for one or more of the evaporators 200 and the condensers 202 of the heat pipes 100. As illustrated, the heat exchanger 240 includes a spiral conduit 242 extending between a fluid inlet 244 and a fluid outlet 246. The spiral conduit 242 may include any numbers of turns disposed one about the other, and may represent a helical-shape. The spiral conduit 242 may be disposed substantially in a common plane, such as a common plane at a particular axial position along the central axis 154 of the absorber 104. In some embodiments, the spiral conduit 242 may spiral over a distance, such as an axial distance along the central axis 154 of the absorber 104.

Figure 7:
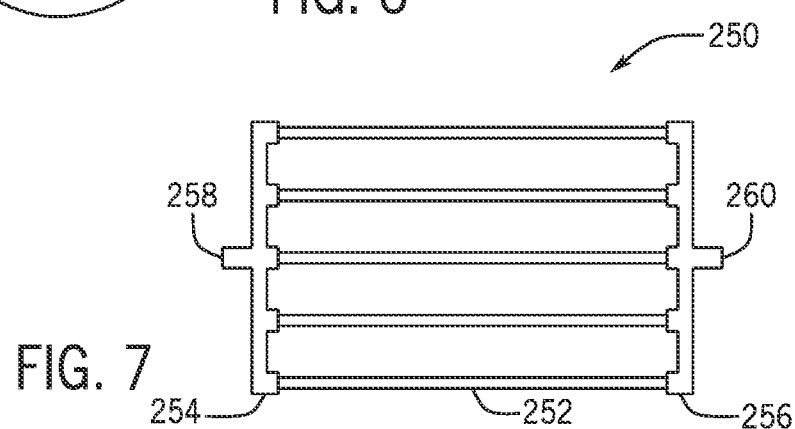
FIG. 7 is a top view of an embodiment of a heat exchanger that may be used for the evaporators and the condensers of the heat pipes of FIGS. 1-3, wherein the heat exchanger has parallel conduits between opposite manifolds.

FIG. 7 is a schematic of an embodiment of a heat exchanger 250 that may be used for one or more of the evaporators 200 and the condensers 202 of the heat pipes 100. As illustrated, the heat exchanger 250 includes a plurality of parallel conduits 252 extending between an intake manifold 254 and a discharge manifold 256. The intake manifold 254 includes a fluid inlet 258, and a discharge manifold 256 includes a fluid outlet 260. The heat exchanger 250 of FIG. 7 may be used at any suitable location within the interior volume 120 of the absorber 104, outside and separate from the enclosure 146 of the absorber 104, or any combination thereof, for one or more of the evaporators 200 and the condensers 202.

Figure 8:
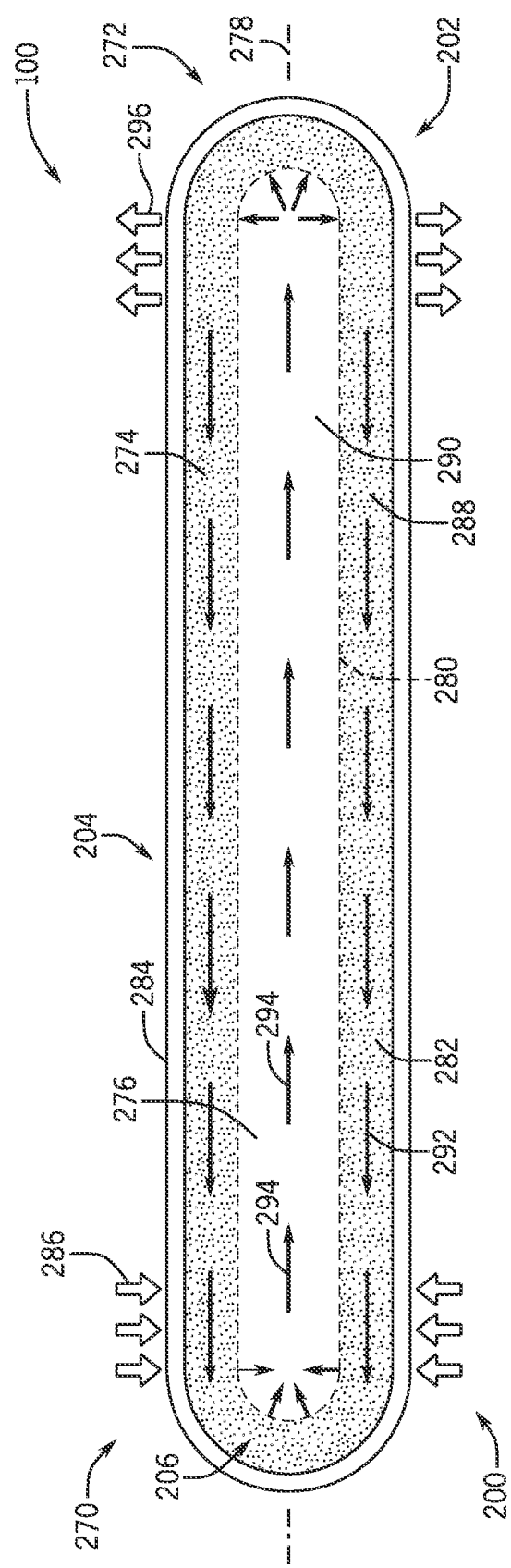
FIG. 8 is a schematic cross-sectional view of an embodiment of one of the heat pipes of FIGS. 1-3.

FIG. 8 is a schematic of an embodiment of the heat pipe 100 of FIGS. 1-7, further illustrating details of the evaporator 200, the condenser 202, and the fluid conduit 204. In the illustrated embodiment, the heat pipe 100 has the evaporator 200 and the condenser 202 disposed at opposite end portions 270 and 272 of the fluid conduit 204. Additionally, the fluid conduit 204 includes an outer flow passage 274 (e.g., outer annular flow passage) disposed about an inner flow passage 276 (e.g., central flow passage). The outer and inner flow passages 274 and 276 are generally in a coaxially or concentric arrangement along a central axis 278 of the heat pipe 100. The outer and inner flow passages 274 and 276 also may be separated by a divider or wall 280, such as an annular divider or wall. The inner flow passage 276 may be an open passage or space along the central axis 278, while the outer flow passage 274 may include a wick 282 (e.g., wick material as described in detail above) substantially filling the outer flow passage 274. The wick 282 may define a shape conforming to the outer flow passage 274, such as an annular wick 282 extending lengthwise along the central axis 278. The fluid conduit 204 also may include a sealed outer enclosure or vessel 284 substantially sealing the outer flow passage 274, the inner flow passage 276, the wick 282, and the working fluid 206.

In operation, the evaporator 200 absorbs or transfers heat into the wick 282 as indicated by arrows 286, thereby vaporizing the working fluid 206. The working fluid 206 flows as a working fluid liquid 288 along the outer flow passage 274 in the wick 282, while the working fluid 206 flows as a working fluid vapor 290 through the inner flow passage 276. Accordingly, at the evaporator 200, the heat absorbed into the heat pipe 100 as indicated by arrows 286 causes a phase change from the working fluid liquid 288 to the working fluid vapor 290. The working fluid liquid 288 flows into the evaporator 200 from the condenser 202 as indicated by arrows 292, and the working fluid vapor 290 flows along the inner flow passage 276 from the evaporator 200 to the condenser 202 as indicated by arrows 294. As the working fluid vapor 290 reaches the condenser 202, heat is transferred away from the working fluid vapor 290 into a surrounding environment as indicated by arrows 296. In turn, the transfer of heat away from the heat pipe 100 at the condenser 202 causes a phase change of the working fluid 206 from the working fluid vapor 290 to the working fluid liquid 288, which then flows along the wick 282 (e.g., via a capillary action and/or gravity) in the outer flow passage 274 back toward the evaporator 200.

As discussed in detail above, the evaporator 200 may be coupled to the absorber 104 inside or outside of the vessel or enclosure 146, such as along the sidewall 164 or across the interior volume 120. Similarly, the condenser 202 of the heat pipe 100 may be coupled to the absorber 104 along the sidewall 164, across the interior volume 120, or completely separate from the enclosure 146 of the absorber 104. In certain embodiments, the heat pipe 100 may be arranged in a horizontal configuration, a vertical configuration, or a combination thereof. The illustrated heat pipe 100 is sealed and self-contained, excludes any moving mechanical parts, and is substantially maintenance free.

Figure 9:
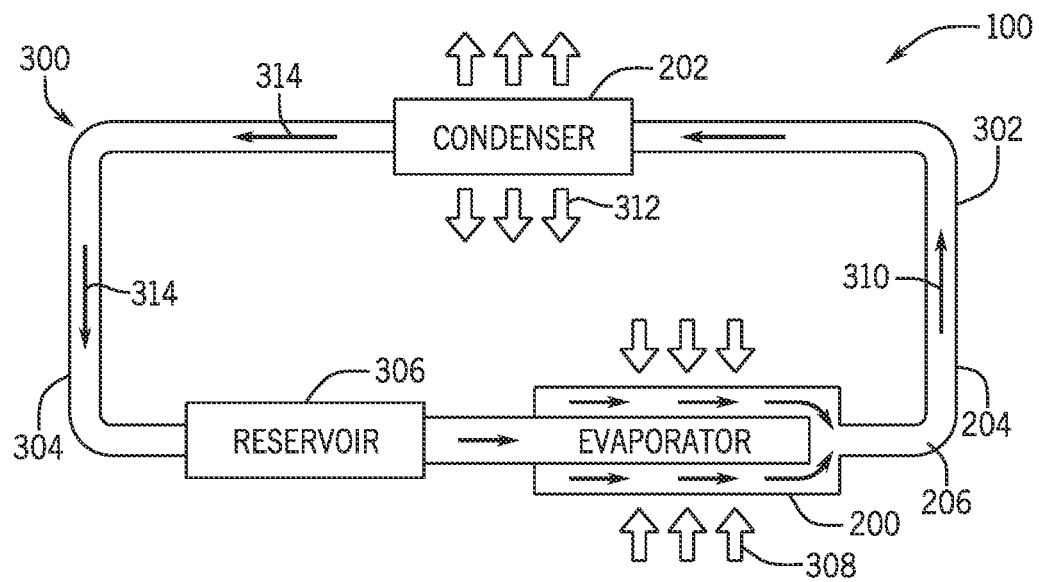
FIG. 9 is a schematic of an embodiment of one of the heat pipes of FIGS. 1-3.

FIG. 9 is schematic of an embodiment of the heat pipe 100 as discussed above with referenced to FIGS. 1-7, further illustrating a configuration of the heat pipe 100 having a closed loop conduit 300. The closed loop conduit 300 of the fluid conduit 204 includes conduit portions 302 and 304. The conduit portion 302 is disposed downstream of the evaporator 200 between the evaporator 200 and the condenser 202, and the conduit portion 304 is disposed downstream of the condenser 202 between the condenser 202 and a reservoir 306 upstream of the evaporator 200.

The evaporator 200 is configured to absorb heat or transfer heat into the working fluid 206 as indicated by arrows 308, thereby causing a phase change of the working fluid 206 from a liquid to a vapor. The evaporator 200 is configured to transfer heat away from the absorber 104 at a location inside and/or outside of the sidewall 164. The working fluid downstream from the evaporator 200 flows through the conduit portion 302 to the condenser 202 as a working fluid vapor 310 as indicated by arrows 310. The condenser 202 receives the working fluid vapor 310 and transfers heat away from the working fluid vapor 310 to surrounding environment as indicated by arrows 312, thereby causing a phase change of the working fluid 206 from the working fluid vapor 310 to a working fluid liquid as indicated by arrows 314. The working fluid liquid 314 flows from the condenser 202 to the reservoir 306 through the conduit portion 304, where the reservoir 306 holds the working fluid liquid 314 prior to heat transfer or heat absorption and evaporation in the evaporator 200. As the evaporator 200 absorbs heat from the surrounding environment into the working fluid liquid 314, the evaporator 200 causes a phase change of the working fluid 206 from the working fluid liquid 314 to the working fluid vapor 310.

In certain embodiments, the evaporator 200 may include a capillary chamber evaporator, a wick material as described in detail above, or another suitable configuration configured to facilitate heat transfer and evaporation of the working fluid 206. The illustrated heat pipe 100 with the closed loop conduit 300 may be used for any one or more of the heat pipes 100 illustrated and described above with reference to FIGS. 1-7. Additionally, the heat pipes 100 illustrated in FIGS. 8 and 9 may be used in combination with one another at various locations throughout the absorber 104. Finally, the heat exchangers 220, 230, 240, and 250 of FIGS. 4, 5, 6, and 7 may be used in various combinations with the heat pipes 100 of FIGS. 8 and 9.

Figure 10:
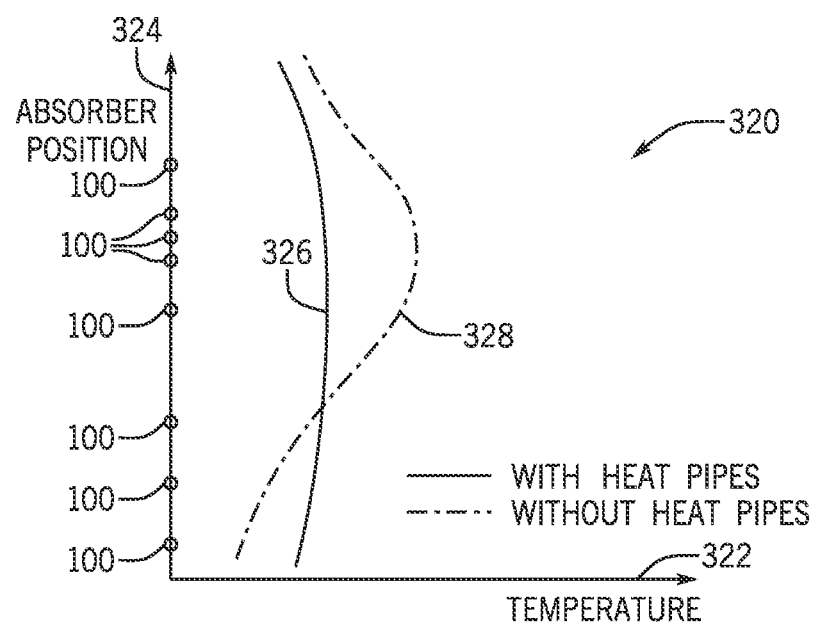
FIG. 10 is a graph of a temperature of an interior volume of an absorber versus an absorber position along a central axis of the absorber of the gas absorption system of FIGS. 1-3, further illustrating temperature profiles with and without the heat pipes.

FIG. 10 is a graph 320 of a temperature 322 of the interior volume 120 of the absorber 104 versus absorber position 324 along the central axis 154 of the absorber 104. In particular, the temperature 322 corresponds to the interior temperature of the fluid flowing through the absorber 104, such as the solvent temperature. The absorber position 324 corresponds to an axial position along the length of the absorber 104 relative to the central axis 154. As indicated in the graph 320, the circles along the vertical axis correspond to locations of heat pipes 100. For example, each heat pipe 100 may have the evaporator 200 or the condenser 202 disposed at the axial positions indicated along the vertical axis corresponding to the absorber position 324. In certain embodiments, the evaporators 200 may be disposed at the positions corresponding to relatively hot spots along the absorber 104, whereas the condensers 202 may be disposed at the positions corresponding to relatively cold spots (or cooler spots) along the absorber 104.

The graph 320 illustrates a temperature profile 326 corresponding to the temperature 322 inside of the absorber 104 with heat pipes disposed at the various absorber positions 324. The graph 320 further illustrates a temperature profile 328 without the heat pipes 100 disposed along the absorber 104. As illustrated by comparing the temperature profiles 326 and 328, the temperature profile 328 without the heat pipes 100 has a greater temperature 322 and greater variance in temperature 322 along the absorber 104. In contrast, the temperature profile 326 with the heat pipes 100 disposed at specific locations along the absorber 104 helps to reduce the peak temperature 322 and provide more temperature uniformity lengthwise along the absorber 104. Accordingly, in certain embodiments, the temperature control system 102 distributes the heat pipes 100 at specific locations having greater temperatures, thereby removing the heat where the temperature is the highest within the absorber 104. The heat pipes 100 also may transfer heat away from the absorber 104 via the evaporators 200 at the relatively hot spots and return heat to the absorber 104 via the condensers 202 at the relatively cold spots to better distribute the heat throughout the absorber 104. In certain embodiments, the heat pipes 100 may be distributed non-uniformly along the absorber 104 at the different absorber positions 324, specifically tailored to locations with the higher temperatures and/or locations with the greatest variance in temperatures. In other embodiments, the heat pipes 100 may be distributed uniformly at equal spacing along the central axis 154 of the absorber 104.

Technical effects of the disclosed embodiments include temperature control of absorbers, such as absorbers to remove undesirable gases (e.g., acid gases and/or exhaust emissions gases), via one or more heat pipes. The heat pipes are self-contained, low maintenance, efficient heat transfer devices, which may exclude any moving parts. The heat pipes may be distributed in a manner to reduce peak temperatures and increase temperature uniformity in the absorbers. The heat pipes also may transfer heat from one location to another in the absorbers. The heat pipes may be coupled to the absorbers along a sidewall, internally across an interior volume, or any combination thereof.

The subject matter described in detail above may be defined by one or more clauses, as set forth below.

A system includes an absorber having a vessel with a solvent inlet, a solvent outlet, a gas inlet, a gas outlet, and an interior volume configured to mix a gas and a solvent, wherein the absorber is configured to absorb an undesirable gas from the gas into the solvent. The system also includes at least one heat pipe coupled to the vessel, wherein the at least one heat pipe is configured to transfer heat away from at least one position along the absorber.

The system of the preceding clause, including a combustion system having a fuel inlet or an exhaust outlet coupled to the absorber.

The system of any preceding clause, wherein the combustion system includes a gas turbine system.

The system of any preceding clause, wherein the undesirable gas includes carbon dioxide ($CO_2$).

The system of any preceding clause, wherein the at least one heat pipe includes a plurality of heat pipes coupled to the vessel at different positions.

The system of any preceding clause, wherein the different positions of the plurality of heat pipes are based on a temperature profile along the absorber, and the plurality of heat pipes are configured to reduce non-uniformity in the temperature profile.

The system of any preceding clause, wherein the at least one heat pipe includes an evaporator, a condenser, at least one fluid conduit extending between the evaporator and the condenser, and a working fluid disposed in the at least one heat pipe.

The system of any preceding clause, wherein the at least one fluid conduit includes an outer fluid passage disposed coaxial with an inner fluid passage.

The system of any preceding clause, wherein the at least one fluid conduit defines a closed-loop conduit having a first conduit portion and a second conduit portion between the evaporator and the condenser.

The system of any preceding clause, wherein the working fluid includes at least one of Cyclopentane (C5H10), a Hydrofluoroether (HFE), or a mixture of methyl nonafluorobutyl ether (methoxyperfluorobutane) and methyl nonfluoroisobutyl ether.

The system of any preceding clause, wherein the evaporator is coupled to the absorber, and the condenser is separate from the absorber.

The system of any preceding clause, wherein the evaporator is disposed at least partially within the interior volume of the vessel, at least partially outside the interior volume of the vessel along a sidewall of the vessel, or a combination thereof.

The system of any preceding clause, wherein the evaporator is coupled to the absorber at a first position, the condenser is coupled to the absorber at a second position different from the first position, and the at least one heat pipe is configured to transfer heat from the first position via the evaporator to the second position via the condenser.

The system of any preceding clause, wherein each of the evaporator and the condenser is disposed at least partially within the interior volume of the vessel, at least partially outside the interior volume of the vessel along a sidewall of the vessel, or a combination thereof.

The system of any preceding clause, wherein the absorber includes a packing disposed within the interior volume, the evaporator is disposed downstream from the packing relative to a first direction of gas flow through the absorber from the gas inlet to the gas outlet, the solvent has a second direction of solvent flow through the absorber from the solvent inlet to the solvent outlet, and the first and second directions are opposite from one another.

In certain embodiments, a method includes absorbing an undesirable gas from a gas into a solvent in an absorber, wherein the absorber includes a vessel having a solvent inlet, a solvent outlet, a gas inlet, a gas outlet, and an interior volume configured to mix the gas and the solvent. The method also includes transferring heat away from at least one position along the absorber via at least one heat pipe coupled to the vessel.

The method of the preceding clause, wherein transferring heat away from the at least one position includes absorbing heat from the absorber via an evaporator of the at least one heat pipe, wherein the evaporator is disposed at least partially within the interior volume of the vessel, at least partially outside the interior volume of the vessel along a sidewall of the vessel, or a combination thereof.

The method of any preceding clause, including transferring heat away from the at least one heat pipe via a condenser separate from the absorber.

The method of any preceding clause, including transferring heat away from the at least one heat pipe via a condenser coupled to the absorber, wherein the condenser is disposed at least partially within the interior volume of the vessel, at least partially outside the interior volume of the vessel along a sidewall of the vessel, or a combination thereof.

In certain embodiments, a system includes a gas turbine system having a fuel supply system and an exhaust section, and an absorber coupled to the fuel supply system or the exhaust section. The absorber includes a vessel having a solvent inlet, a solvent outlet, a gas inlet, a gas outlet, and an interior volume configured to mix a gas and a solvent. The absorber is configured to absorb an undesirable gas from the gas into the solvent, wherein the undesirable gas includes carbon dioxide ($CO_2$). The system also includes at least one heat pipe coupled to the vessel, wherein the at least one heat pipe is configured to transfer heat away from at least one position along the absorber.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an absorber, comprising:
a vessel having a solvent inlet, a solvent outlet, a gas inlet, a gas outlet, and an interior volume configured to mix a gas and a solvent, wherein the absorber is configured to absorb an undesirable gas from the gas into the solvent; and
at least one heat pipe coupled to the vessel, wherein the at least one heat pipe comprises an evaporator, a condenser, at least one fluid conduit extending between the evaporator and the condenser, and a working fluid disposed in the at least one heat pipe, wherein the evaporator is coupled to the absorber at a first position, wherein the condenser is coupled to the absorber at a second position different from the first position, wherein the at least one heat pipe is configured to transfer heat from the first position via the evaporator to the second position via the condenser.

2. The system of claim 1, comprising a combustion system having a fuel inlet or an exhaust outlet coupled to the absorber.

3. The system of claim 2, wherein the combustion system comprises a gas turbine system.

4. The system of claim 1, wherein the undesirable gas comprises carbon dioxide ($CO_2$).

5. The system of claim 1, wherein the at least one heat pipe comprises a plurality of heat pipes coupled to the vessel at different positions.

6. The system, of claim 5, wherein the different positions of the plurality of heat pipes are based on a temperature profile along the absorber, and the plurality of heat pipes are configured to reduce non-uniformity in the temperature profile.

7. The system of claim 5, wherein the different positions of the plurality of heat pipes comprise different axial positions, different circumferential positions, or a combination thereof, relative to an axis of the absorber.

8. The system of claim 1, wherein the at least one fluid conduit comprises an outer fluid passage disposed coaxial with an inner fluid passage.

9. The system of claim 1, wherein the at least one fluid conduit defines a closed-loop conduit having a first conduit portion and a second conduit portion between the evaporator and the condenser.

10. The system of claim 1, wherein the working fluid comprises at least one of Cyclopentane ($C_5H_{10}$), a Hydrofluoroether (HFE), or a mixture of methyl nonafluorobutyl ether (methoxyperfluorobutane) and methyl nonfluoroisobutyl ether.

11. The system of claim 1, wherein the first position of the evaporator is offset upstream relative to the second position of the condenser in a flow direction of the solvent from the solvent inlet to the solvent outlet of the absorber.

12. The system of claim 1, wherein each of the evaporator and the condenser is disposed outside of the interior volume of the vessel along a sidewall of the vessel.

13. The system of claim 1, wherein each of the evaporator and the condenser is disposed at least partially within the interior volume of the vessel, at least partially outside the interior volume of the vessel along a sidewall of the vessel, or a combination thereof.

14. The system of claim 1, wherein the absorber comprises a packing disposed within the interior volume, the evaporator is disposed downstream from the packing relative to a first direction of gas flow through the absorber from the gas inlet to the gas outlet, the solvent has a second direction of solvent flow through the absorber from the solvent inlet to the solvent outlet, and the first and second directions are opposite from one another.

15. A method, comprising:
absorbing an undesirable gas from a gas into a solvent in an absorber, wherein the absorber comprises a vessel having a solvent inlet, a solvent outlet, a gas inlet, a gas outlet, and an interior volume configured to mix the gas and the solvent; and
transferring heat between first and second positions along the absorber via at least one heat pipe coupled to the vessel, wherein the at least one heat pipe comprises an evaporator, a condenser, at least one fluid conduit extending between the evaporator and the condenser, and a working fluid disposed in the at least one heat pipe, wherein the evaporator is coupled to the absorber at the first position, wherein the condenser is coupled to the absorber at the second position different from the first position, wherein the at least one heat pipe is configured to transfer heat from the first position via the evaporator to the second position via the condenser.

16. The method of claim 15, wherein each of the evaporator and the condenser is disposed at least partially within the interior volume of the vessel, at least partially outside the interior volume of the vessel along a sidewall of the vessel, or a combination thereof.

17. The method of claim 15, wherein the undesirable gas comprises carbon dioxide ($CO_2$).

18. The method of 17, wherein the gas comprises an exhaust gas from a gas turbine system.

19. A system, comprising:
a gas turbine system having a fuel supply system and an exhaust section;
an absorber coupled to the fuel supply system or the exhaust section, wherein the absorber comprises:
a vessel having a solvent inlet, a solvent outlet, a gas inlet, a gas outlet, and an interior volume configured to mix a gas and a solvent, wherein the absorber is configured to absorb an undesirable gas from the gas into the solvent, wherein the undesirable gas comprises carbon dioxide ($CO_2$); and
at least one heat pipe coupled to the vessel, wherein the at least one heat pipe comprises an evaporator, a condenser, at least one fluid conduit extending between the evaporator and the condenser, and a working fluid disposed in the at least one heat pipe, wherein the evaporator is coupled to the absorber at a first position, wherein the condenser is coupled to the absorber at a second position different from the first position, wherein the at least one heat pipe is configured to transfer heat from the first position via the evaporator to the second position via the condenser.

20. The system of claim 19, wherein the at least one heat pipe comprises a plurality of heat pipes coupled to the vessel at different positions based on a temperature profile along the absorber, and the plurality of heat pipes are configured to reduce non-uniformity in the temperature profile.

* * * * *